US009799372B2

(12) United States Patent
Meyer et al.

(10) Patent No.: US 9,799,372 B2
(45) Date of Patent: Oct. 24, 2017

(54) SYSTEM AND METHOD FOR EMBEDDING SUPPLEMENTARY DATA INTO DIGITAL MEDIA FILES

(71) Applicant: Time Warner Cable Enterprises LLC, New York, NY (US)

(72) Inventors: Thomas W. Meyer, Haiku, HI (US); Josslyn M. Meyer, Haiku, HI (US)

(73) Assignee: Time Warner Cable Enterprises LLC, Saint Louis, MO (US)

( * ) Notice: Subject to any disclaimer, the term of this patent is extended or adjusted under 35 U.S.C. 154(b) by 694 days.

(21) Appl. No.: 14/182,619

(22) Filed: Feb. 18, 2014

(65) Prior Publication Data

US 2014/0161420 A1 Jun. 12, 2014

Related U.S. Application Data

(60) Continuation of application No. 12/117,522, filed on May 8, 2008, now Pat. No. 8,694,665, which is a continuation of application No. 11/197,716, filed on Aug. 4, 2005, now abandoned, which is a division of application No. 09/389,942, filed on Sep. 3, 1999, now Pat. No. 7,188,186.

(51) Int. Cl.
*G06F 15/16* (2006.01)
*G11B 27/029* (2006.01)
*H04N 1/32* (2006.01)
*H04N 9/79* (2006.01)

(52) U.S. Cl.
CPC ....... *G11B 27/029* (2013.01); *H04N 1/32144* (2013.01); *H04N 1/32154* (2013.01); *H04N 1/32277* (2013.01); *H04N 9/79* (2013.01); *H04N 2201/327* (2013.01); *H04N 2201/3233* (2013.01)

(58) Field of Classification Search
CPC ............. H04L 1/32144; H04L 1/32154; H04L 1/32277; H04L 9/79; H04L 2201/3233; H04L 2201/327; G11B 27/029
See application file for complete search history.

(56) References Cited

U.S. PATENT DOCUMENTS 5,870,087 A * 2/1999 Chau .................... H04N 5/4401
348/E5.108
6,157,330 A * 12/2000 Bruekers ............... G06T 1/0035
341/143

(Continued)

OTHER PUBLICATIONS

M.Nilsson, ID3 tag version 2.3.0, Feb. 3, 1999, pp. 1-42.*

(Continued)

*Primary Examiner* — Larry Donaghue
(74) *Attorney, Agent, or Firm* — Chapin IP Law, LLC (57) ABSTRACT

A novel process and system for flexibly adding supplemental digital program content such as, for example, transactional advertising content, games, polls, contests, interactive music videos, and e-commerce content generally and the like, into pre-prepared digital media files, such as an MP3 audio file or the like, for playback by digital playback apparatus, wherein the pre-prepared media file is modified by embedding therein executable code representing such supplemental program content, and enabling the playback apparatus to decode and execute the presentation of the supplemental program material as an addition to the playback of the pre-prepared media file content.

15 Claims, 10 Drawing Sheets

Encoding
System Overview (56) References Cited

U.S. PATENT DOCUMENTS

| | | | | |
|---|---|---|---|---|
| 6,314,192 B1* | 11/2001 | Chen | ................... | G06T 1/0028 |
| | | | | 382/100 |
| 6,892,226 B1* | 5/2005 | Tso | ................... | G06Q 30/0207 |
| | | | | 709/218 |
| 6,988,201 B1* | 1/2006 | Xu | ...................... | G06Q 20/401 |
| | | | | 705/75 |
| 8,108,899 B2* | 1/2012 | Shoff | ................ | H04N 5/44543 |
| | | | | 725/51 |
| 8,181,200 B2* | 5/2012 | Schein | ................. | G06F 3/0481 |
| | | | | 709/229 |
| 2004/0133910 A1* | 7/2004 | Gordon | ............. | H04N 5/44543 |
| | | | | 725/37 |

OTHER PUBLICATIONS

Dutta et al. Smart Vudeo Streams: 101 uses of a the data field in Mpeg, pp. 1462-1466, 1996.*
Bender et al. , Techniques for data hiding ; pp. 313-336, 1996.*
Bender et al. Techniques for data hiding , pp. 313-336,particular p. 326-327 ,1996.*

\* cited by examiner

FIG. 7

SYSTEM AND METHOD FOR EMBEDDING SUPPLEMENTARY DATA INTO DIGITAL MEDIA FILES

RELATED APPLICATIONS

This application is a continuation of earlier filed U.S. patent application Ser. No. 12/117,522 entitled "SYSTEM AND METHOD FOR EMBEDDING SUPPLEMENTARY DATA INTO DIGITAL MEDIA FILES," filed on May 8, 2008, the entire teachings of which are incorporated herein by this reference.

U.S. patent application Ser. No. 12/117,522 is a continuation of U.S. patent application Ser. No. 11/197,716, filed on Aug. 4, 2005, the entire teachings of which are incorporated herein by this reference.

U.S. patent application Ser. No. 11/197,716 is a divisional application of U.S. patent application Ser. No. 09/389,942 filed on Sep. 3, 1999 and U.S. Pat. No. 7,188,186, Issued Mar. 6, 2007, the entire teachings of which are incorporated herein by this reference.

BACKGROUND

There has been extensive prior use of the general concept of embedding various types of information in video, audio, sound, text, and other multimedia formats. There are two main approaches that have heretofore been employed to achieve these ends: 1) extending the format or creating a new format which contains that type of data; or 2) embedding the data, using techniques which allow the data to be recovered, but which do not affect the backwards compatibility of the format.

Examples of the second type of approach arise frequently in communication and entertainment media; for example, the backwards compatibility of color-television broadcast, or the transmission of subtitles and other information embedded in a video signal. Another example of a very popular application is the encoding of identification information in a media file so that it is robust to degradation, and transformation of the media file generally for purposes such as intellectual-property protection—often referred to as "watermarking". These techniques and others of similar character are directed, however, towards the embedding of relatively low bit-rate data, roughly on the order of 22 binary digits (bits) of data per second. Such data typically consists of short and simple ASCII text or other unique identifiers. In another application, a control code is used for a computer system, to provide a very short signal control code as for preventing the computer from copying a copy-protected data file.

Among prior patents illustrative of such and related techniques and uses are U.S. Pat. No. 4,379,947 (dealing with the transmitting of data simultaneously with audio); U.S. Pat. No. 5,185,800 (using bit allocation for transformed digital audio broadcasting signals with adaptive quantization based on psychoauditive criteria); U.S. Pat. No. 5,687,236 (steganographic techniques); U.S. Pat. No. 5,710,834 (code signals conveyed through graphic images); U.S. Pat. No. 5,832,119 (controlling systems by control signals embedded in empirical data); U.S. Pat. No. 5,850,481 (embedded documents, but not for arbitrary data or computer code); U.S. Pat. No. 5,889,868 (digital watermarks in digital data); and U.S. Pat. No. 5,893,067 (echo data hiding in audio signals).

Prior publications describing such techniques include [0006] Bender, W. D. Gruhl, M Morimoto and A. Lu, "Techniques for data hiding", IBM Systems Journal, Vol. 35, Nos. 3 & 4, 1996, p. 313-336; [0007] MPEG Spec—ISO/IEC 11172, parts 1-3, Information Technology—Coding of moving pictures and associated audio for digital storage media at up to about 1.5 Mbit's, Copyright 1993, ISO/IEC; and [0008] ID3v2 spec:

A survey of techniques for multimedia data labeling and particularly for copyright labeling using watermarking through encoding low bit-rate information is presented by Langelaar, G. C. et al in "Copy Protection for Multimedia Data based on Labeling Techniques

BRIEF DESCRIPTION OF EMBODIMENTS

Underlying the present invention, however, is a novel technique for embedding a set of executable program instructions at high bit rates into a media file, without substantially affecting the user's playback experience of the media, and wherein, unlike prior art techniques, sequences of executable code are embedded in audio, video, image or sound formats, such as, for example, entertainment music or video programs or the like, which have not been specifically pre-designed as a container for, or to contain, such executable codes.

This supplemental embedding is done seamlessly and facilely, enabling supplementary graphic, interactive and/or e-commerce program content, such as the before-mentioned transactional and other advertising, interactive music videos, and e-commerce content, to be incorporated into the entertainment or other media files for execution by players and viewers while playing back the original entertainment or other media file material.

This technique has four main advantages: 1) executable code may be placed directly in the media file, simplifying content distribution and permitting the data and the executable code to be tightly integrated; 2) augmented viewers can transparently access the executable code; 3) existing viewers are backwards compatible and can still view the media file; and 4) large amounts of supplemental data may be facilely embedded in the media file Using stegonographic techniques, moreover, the invention can embed data at very high bit rates. In one embodiment later discussed, for example, more than 3000 bits of executable code data per second are embedded in an MP3 audio file encoded at a bit-rate of 128,000 bits/sec. (later discussed in connection with Table 1 herein).

A principal object of the invention, accordingly, is to provide a new and improved process and system for seamlessly embedding executable program code into pre-prepared media file formats for execution by digital media player and viewing apparatus or systems and the like, to provide supplementary content such as the before-mentioned transactional advertising, games, interactive music videos, e-commerce and the like, for execution and presentation by the digital player and viewing apparatus or systems, while continuing to present the original pre-prepared media file programs.

A further object is to provide such a novel technique that is particularly useful for "MP3" applications and the like.

Another object is to open up new methods of conducting business through enabling consumer and related digital media file or disc players and viewers and the like to present also supplemental transactional advertising and e-commerce functions and the like, as later more fully explained.

Other and further objects will be explained hereinafter and are more particularly delineated in the appended claims.

In summary, however, from one of its broader points of view, the invention embraces a process for supplementing pre-prepared media digital file content to be performed by a digital playback apparatus, with supplemental digital program content, that comprises, preparing such supplemental digital program content in the form of executable code; and embedding the executable code into the pre-prepared media file for execution by the playback apparatus supplementary to the playback of the pre-prepared media file content.

From another viewpoint, the invention provides a system for flexibly adding supplemental digital program content to the playback of a pre-prepared media file by digital playback apparatus, comprising means for modifying the pre-prepared media digital file to embed sequences of executable code therein representing such supplemental program content; means provided in the digital playback apparatus for decoding the embedded code during playback of the modified media file at the digital playback apparatus; and, in addition to means for playing back of the pre-prepared content of the media file, means provided at the digital playback apparatus responsive to the decoding for also presenting thereat the supplemental program content.

Preferred and best mode embodiments, designs, applications and implementations will be later fully described.

BRIEF DESCRIPTION OF THE DRAWINGS

The invention will now be described with reference to the accompanying drawings, FIGS. 1a, 1b and 1c of which are pictorial diagrams illustrative of novel supplementary presentations achievable by the use of sequences of embedded executable code of the present invention, with consumer and other digital "MP3" players.

DETAILED DESCRIPTION AND FURTHER SUMMARY OF EMBODIMENTS

Before describing the preferred implementations of the novel process and systems of the invention, it is believed necessary to define and provide illustrative examples of the various terms and system components involved.

As earlier stated, and underlying the invention, is the overall concept of providing and novelly embedding in multi-media formats, executable code representing content supplemental to the present-day pre-prepared content of multi-media files (audio, video, still image, 3-D, combinations thereof, or other media formats) that are provided to be played or viewed by digital computer systems or apparatus (such as portable music players, PDAs or personal digital assistants, digital televisions, car stereos, home audio systems, video walls, Web TV, console and portable digital game devices and the like). By seamlessly embedding such sequences of supplemental content executable code in the pre-prepared media file, the player or viewer apparatus, in decoding the code, can also present such supplemental or additional content (for example, ads, interactive music videos, e-commerce, games, polls, and contests etc., as earlier mentioned), while presenting the pre-prepared program of the media file—adding immeasurable additional information and facilities and significantly also increasing business and customer opportunities as a result thereof—in fact, a new method of doing or conducting such business at the player or viewer apparatus.

Figure 1:
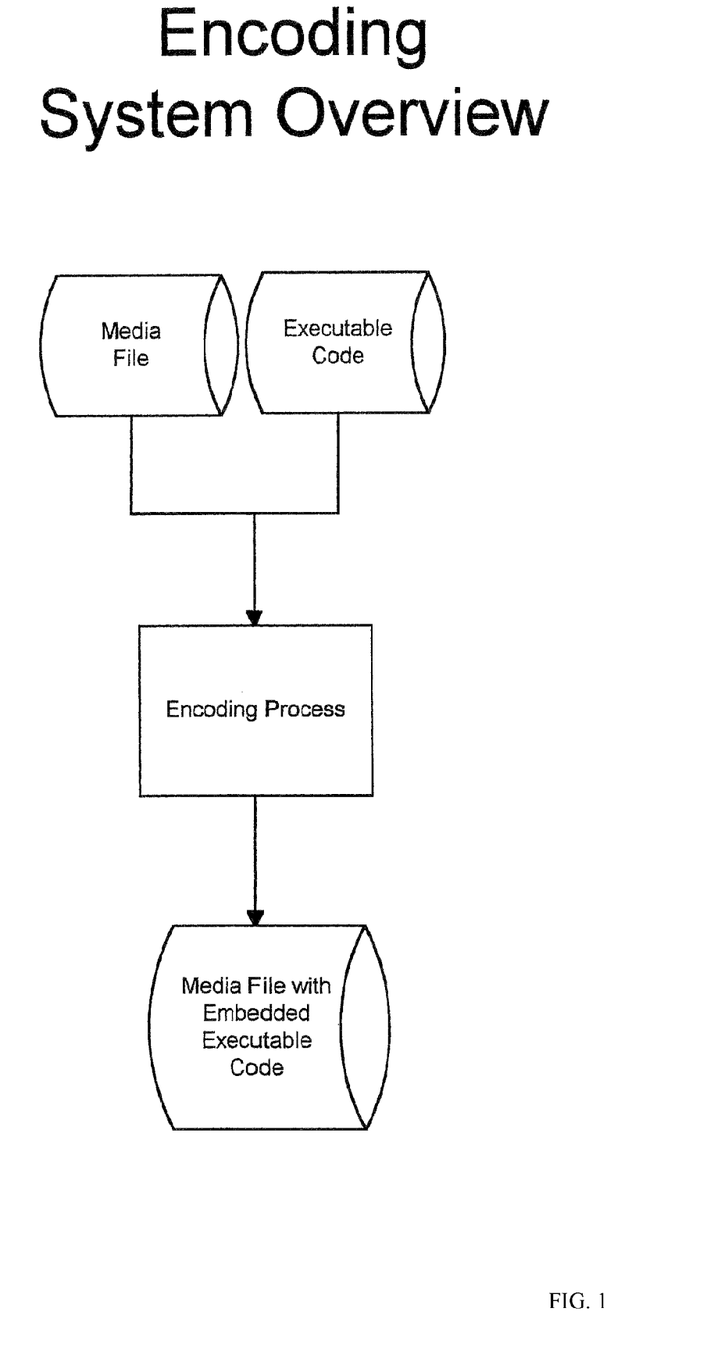
FIG. 1 is a block and flow diagram showing an overview of the encoding process and system operating in accordance with a preferred embodiment of the invention.
Figure 1A:
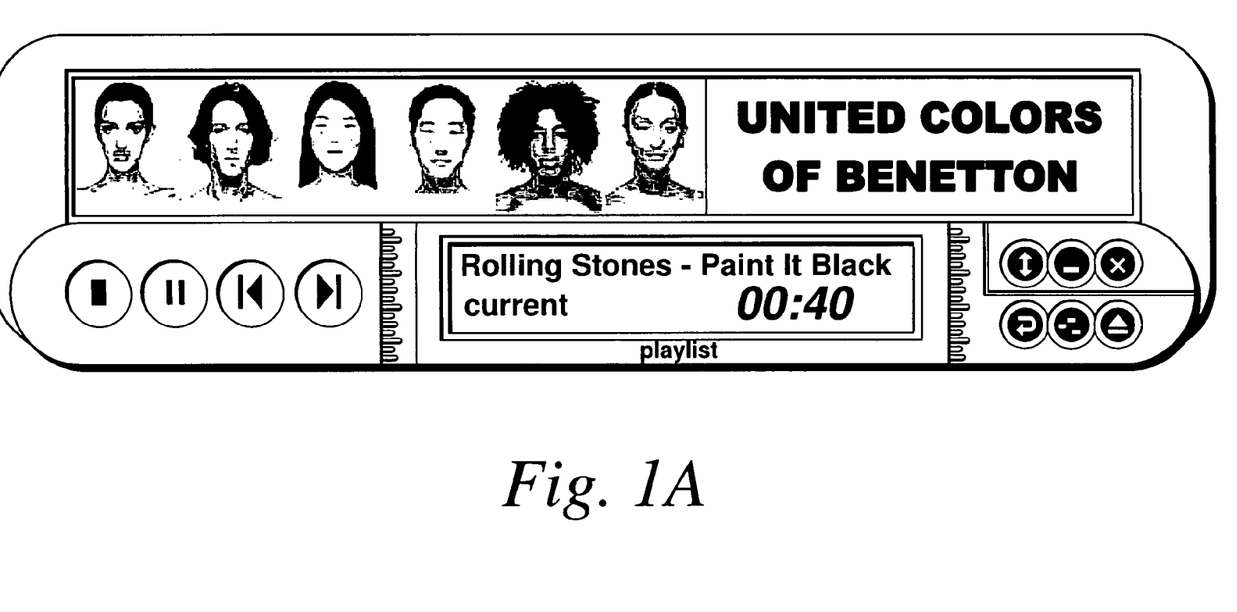
Figure 1B:
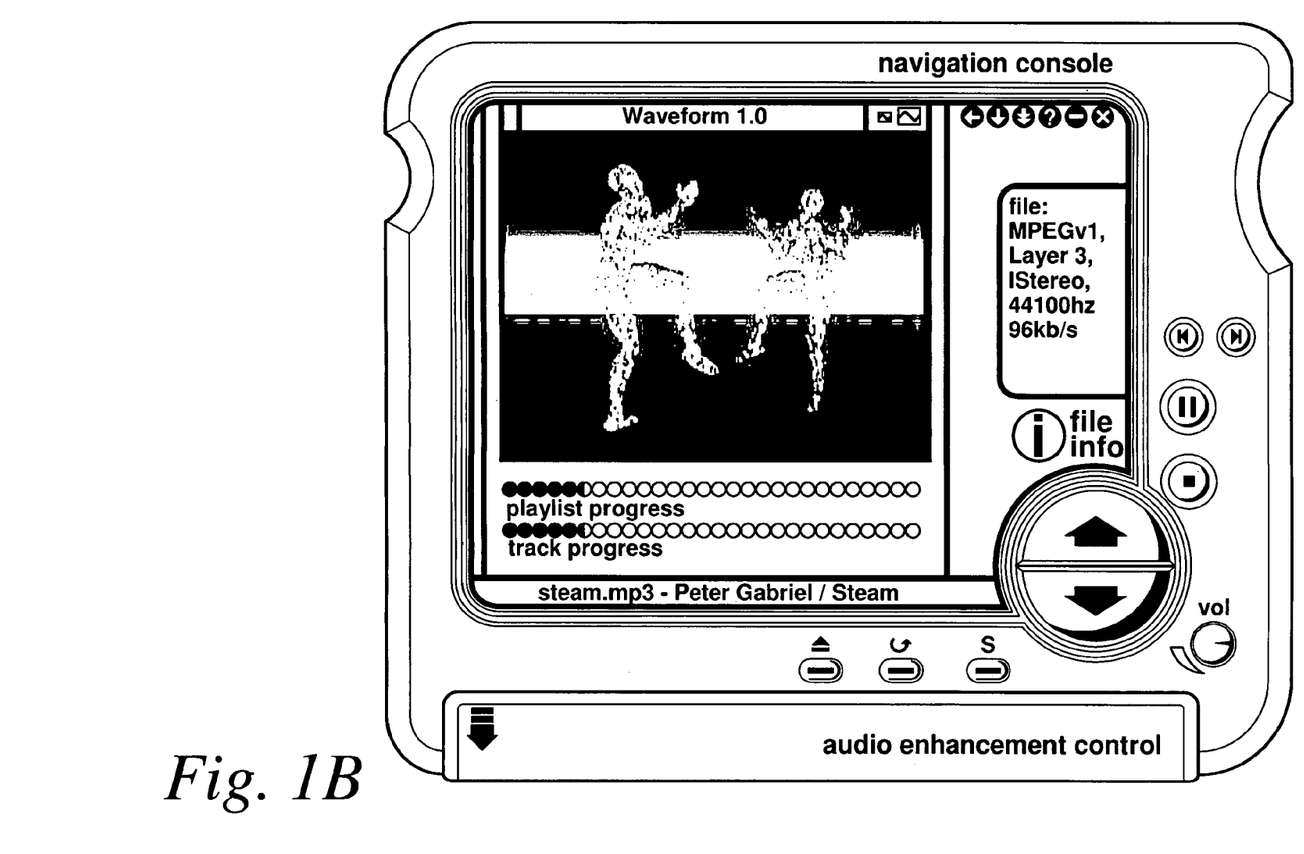
Figure 1C:
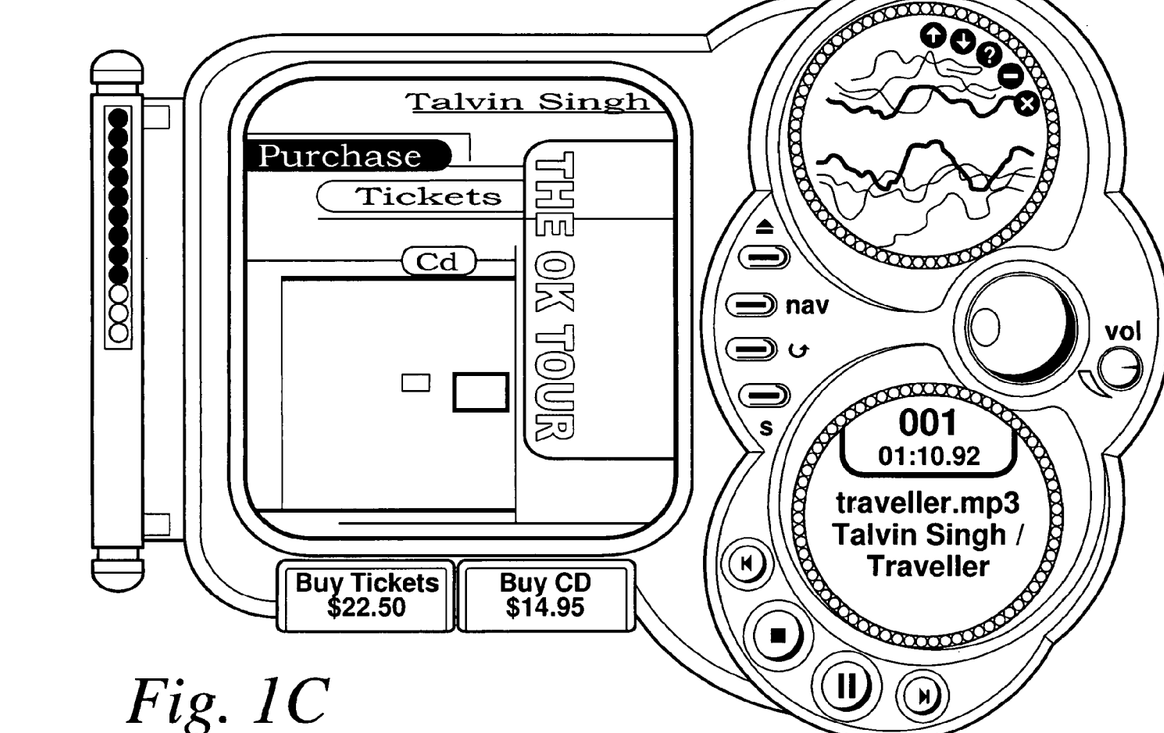

Referring to FIGS. 1a, 1b and 1c, for example, the addition of graphical, interactive and e-commerce-enabled content through the sequenced executable code embedding in the media file in accordance with present invention, is illustrated as presented upon exemplary well-known present-day widely distributed "MP3" audio players. The abbreviation "MP3" describes an MPEG layer III audio file—a standard audio file format in wide use today throughout the world, as described in the published standard ISO/IEC 11172-3. The abbreviation MPEG stands for the audio and video compressed formats developed by the Motion Picture Experts Group, and formalized by ISO/IEC JTC1, as the before-mentioned International Standard ISO/IEC 11172, parts 1-3. Part 1 addresses the System; Part 2 is Video; and Part 3 is Audio Encoding.

In FIG. 1a, the embedding of a 468.times.60 pixel interactive banner ad [the "United Colors Of Benetton"] into the MP3 stream is shown displayed within a "Free Amp" type MP3 player—adding media presentation to the player music [the "Paint It Black" song]. This enables advertiser-sponsored music files, using the music to sell products. The facility for promoting and marketing directly to whatever demographic may be desired is thus opened up by the invention, also enabling the subsidizing of music distribution as well.

Similar opening-up of new avenues is provided in FIG. 1b, illustrating the embedding of executable code (in this case, an interactive music video which responds to and is synchronized with the user's mouse movement and the beat of the music, as illustrated by the dancing figures), within a well-known commercial "Sonique" MP3 player.

As a third example of the new business solicitation opportunities afforded by the present invention, FIG. 1c illustrates the embedding of executable code (in this case, an e-commerce application with a graphical user interface), allowing the user to buy tickets (so-labeled) or a CD, within another well-known commercial version of the Sonique MP3 player. This opens up a new and previously unavailable avenue of embedded point-of-purchase sales, enabling fully transactional ads and merchandising directly to the listener at the playback apparatus.

Further in accordance with the novel technique of the invention, the embedding of this executable code in the media file is seamlessly effected in such a way, as later explained, that compatible players/viewers are able to extract the executable code and perform operations based on it, while incompatible players/viewers are still able to play the media file as if there were no additional embedded information. Currently, none of these players of the type shown in FIGS. 1a, 1b and 1c support displays such as illustrated; they only allow for the extraction of limited data such as song titles and lyrics information from the MP3 stream, and for separately downloaded code ("plugins") which can be executed while the MP3 is playing. They do not allow for the embedding of sequences of executable code in the MP3 stream as is effected by the present invention.

Examples of the types of media files susceptible to operating with the embedded executable code sequence programs of the invention include, but are not limited to, the previously enumerated audio, video, still image, 3-D, or a combination of these or other media formats. Among these are MP3, SDMI, CD audio, AIFF, AU, WAV RealAudio Quicktime, MPEG, AVI, JPEG, JFIF, GIF, PNG, TIFF, DXF, or VRML.

Among the types of executable code programs which may be embedded into such media files are Java files, Macromedia Director, Shockwave or Flash, Perl, VRML, TCL, Visual Basic, machine code, byte codes, any archive format such as cab, jar or zip; or any combination of any of these programs with any non-executable media, including but not limited to image, audio, 3-D, or text. The content may be, but is not limited to, advertising, as previously mentioned, entertainment, utilities, applications, education, design, interactive advertising, transactional merchandising, or interactive content such as music videos, games, polls and contests, and the like.

It is now in order to explain how the encoding and code embedding in the pre-prepared media file may be implemented in accordance with the invention. Reference is accordingly made to FIG. 1 wherein a pre-prepared media file, so-labeled, (audio, image, video, 3-D, database, or other multimedia data as before mentioned), and a predetermined prepared executable code sequence (such as the previously mentioned computer program Java class files, Macromedia Shockwave and Flash, binary executables, byte codes, Visual Basic, Java Script, etc.) are shown fed to an encoding processor for embedding the code sequences, such as, for example, of the encoding types later described. Well-known encoding processes may be used depending on the media file format and any well-known compression techniques for the media file to be created, as later discussed. There then results a modified media file with embedded executable code without affecting its backwards compatibility with existing file formats, and without substantially affecting the user's experience of playback of the pre-prepared media file content.

It is to be noted, moreover, that the invention embeds sequences of executable code representing content supplemental to the pre-prepared content of the media file, into media file being (though not limited to) an MPEG-1, MPEG-2, or MPEG-2.5 file, to be encoded using the Layer I, II, or III encodings. As in FIG. 1, the executable code, so-labeled in FIG. 3, may be in any kind of computer programs such as Java class files, Macromedia Shock wave and Flash, binary executables, byte codes, Visual Basic, Java Script, etc. The executable code is first shown unsynchronized by modifying any consecutive bytes of form %11111111 111 xxxxx so that they do not resemble a synchronization byte in the MPEG audio stream. The code is then encapsulated in ID3v2 format, and inserted in the encoding process, as shown, at the beginning of the MP3 audio stream as an ID3v2 tag. This results in an MPEG audio file with the embedded executable code, backwards compatible but slightly larger to accommodate the embedded code, and with the audio data unaffected, and any occurrences of the MPEG sync signal taken care of by the unsynchronization scheme.

More specifically, a preferred encoding system will now be detailed for such an MPEG audio stream, particularly with reference to the before-cited publicly available ID3v2.3.0 specification ("ID3v2"). There are a number of existing content types described in the ID3v2 spec, there named "frames". Frames are defined primarily for the ASCII text data such as song titles and lyrics, or for a still image to be embedded in the MPEG audio file. In this description, we create and define a new type of ID3 frame, named "EXEC", which is designed as a container for executable content, generally intended to be executed while the audio is playing.

In the following description, the notation $xx is used to refer to a hexadecimal-encoded octet, e.g., $00 represents the eight binary digits 00000000. The first four octets of this frame are the ISO-8859-1 (ASCI I) characters "EXEC". This, in turn, is followed by formats that have not been specifically predesigned as a container for, or to contain any such executable code. The code is placed directly into the media file, simplifying content distribution and permitting the data and executable code to be tightly integrated as earlier noted.

Figure 2:
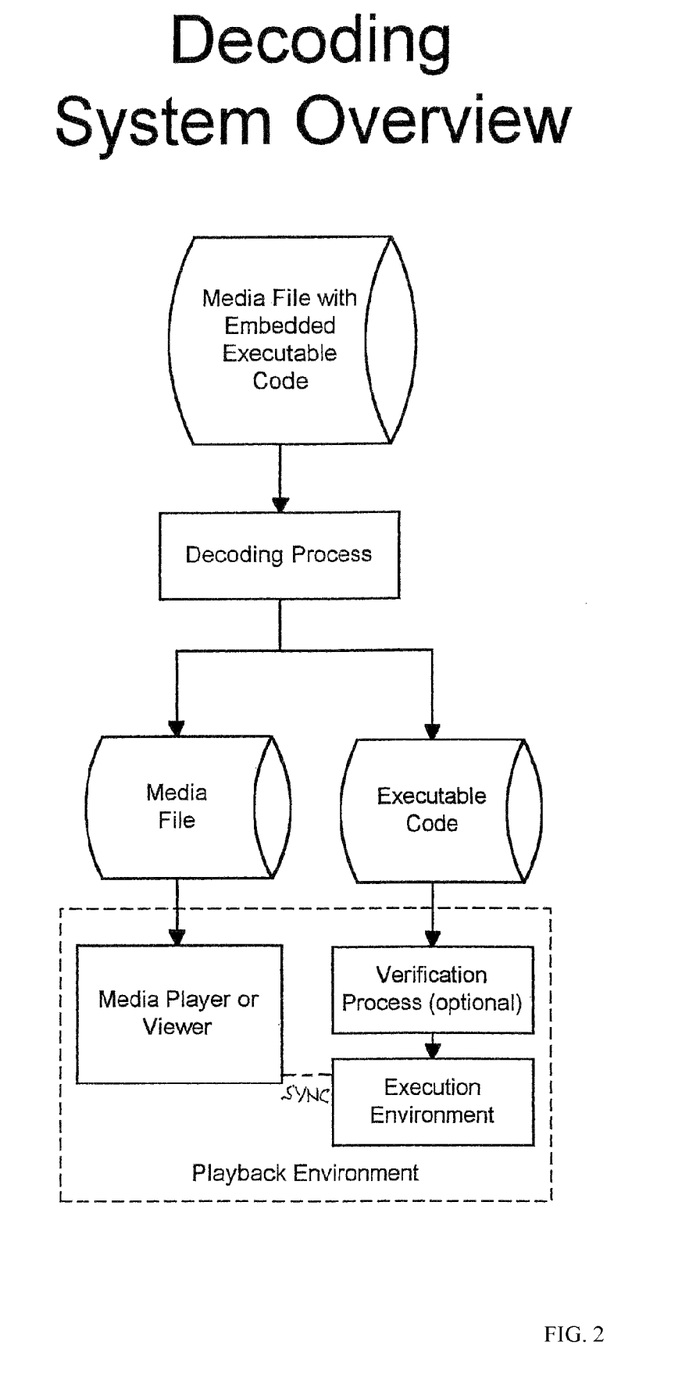
FIG. 2 is a similar diagram presenting an overview of the decoding of the media file embedded with the executable code created in FIG. 1, as executed by the media player or viewer.

At the player or viewer-playback apparatus, FIG. 2, the media file with the embedded executable code is shown fed to a decoding processor, such as later described. The original pre-prepared media file content [the "Paint It Black" song of FIG. 1a, for example] is usually unchanged in the decoding process because it may often be unfeasible to remove the executable code and because doing so would not typically improve the user's playback experience, and is shown communicating on the left-hand side of FIG. 2 with the media player apparatus of the playback environment. The decoded executable code [representing the "United Colors Of Benetton" display content of FIG. 1a, for example], bitwise identical to the original executable code encoded in FIG. 1, is fed (right-hand side in FIG. 2) to the execution part of the playback environment. As an optional feature, a well-known checksum or digital signature is shown usable at "Verification Process", to verify that the code is unchanged before it is executed.

Where desired, moreover, the execution of the executable code [the "United Colors Of Benetton" display above discussed, for example] may be synchronized by well-known communication with the player playback of the media file [the song "Paint It Black" or a selected portion thereof], as schematically shown by the legend "SYNC".

Figure 3:
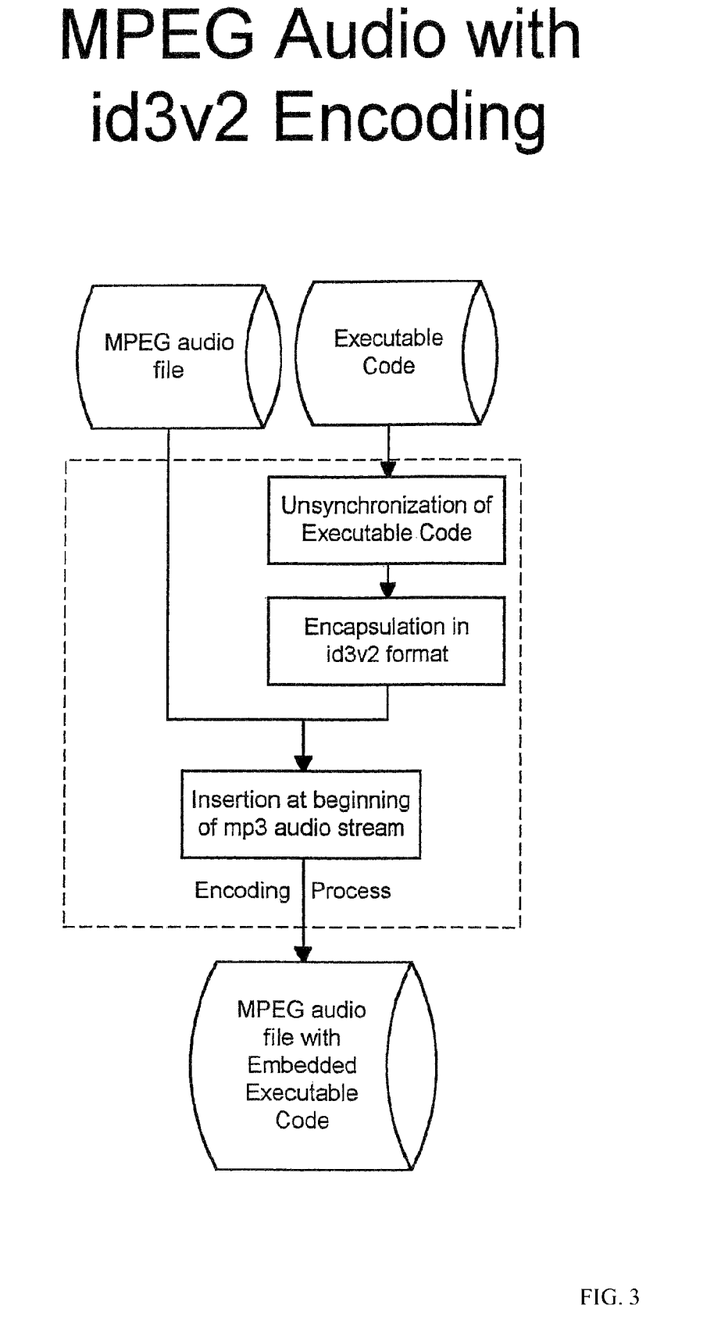
FIG. 3 is again a diagram similar to FIG. 1, but detailed to show encoding for the illustrative specific example of MPEG audio (discussed in the earlier-referenced "MPEG Spec" publication), with id3v2 encoding (discussed in the previously cited. "ID3v2 spec")

As a more specific example, FIG. 3 diagrams the use of the before-described MPEG audio file into which the executable code is to be embedded. Reference is again made to the earlier cited "MPEG Spec" and "ID3v2 Spec" publications—the MPEG audio file being (though not limited to) an MPEG-1, MPEG-2, or MPEG-2.5 file, to be encoded using the Layer I, II, or III encodings. As in FIG. 1, the executable code, so-labeled in FIG. 3, may be in any kind of computer programs such as Java class files, Macromedia Shock wave and Flash, binary executables, byte codes, Visual Basic, Java Script, etc. The executable code is first shown unsynchronized by modifying any consecutive bytes of form %11111111 111 xxxxx so that they do not resemble a synchronization byte in the MPEG audio stream. The code is then encapsulated in ID3v2 format, documented at the public web site http://id3.org, and inserted in the encoding process, as shown, at the beginning of the MP3 audio stream as an ID3v2 tag. This results in an MPEG audio file with the embedded executable code, backwards compatible but slightly larger to accommodate the embedded code, and with the audio data unaffected, and any occurrences of the MPEG sync signal taken care of by the unsynchronization scheme.

More specifically, a preferred encoding system will now be detailed for such an MPEG audio stream, particularly with reference to the before-cited publicly available ID3v2.3.0 specification ("ID3v2"), located at http://www.id3.org/id3v2.3.0.html. There are a number of existing content types described in the ID3v2 spec, there named "frames". Frames are defined primarily for the ASCII text data such as song titles and lyrics, or for a still image to be embedded in the MPEG audio file. In this description, we create and define a new type of ID3 frame, named "EXEC", which is designed as a container for executable content, generally intended to be executed while the audio is playing.

In the following description, the notation $xx is used to refer to a hexadecimal-encoded octet, e.g., $00 represents the eight binary digits 00000000. The first four octets of this frame are the ISO-8859-1 (ASCI I) characters "EXEC". This, in turn, is followed by a four-octet Size header and a two-octet Flags header, as described in the ID3v2 specification. This is followed by $00, to represent the use of IS-8859-1 text encoding within the frame, or by $01, to represent the use of ISO/IEC 10646-1 (Unicode) text encoding, later referenced. The next element is the ISO 8859-1 encoded MIME type of the executable content, as described in IETF RFC 2045, also later referenced, followed by $00. For example, the MIME type of the before-mentioned Macromedia Flash files is "application/x-shockwave-flash". This is followed by a description of the executable code in the text encoding defined for that frame, terminated by $00 if the encoding is ASCI I, or $00 $00 if the encoding is Unicode. This is followed by a single octet which is $00 if there is no checksum, or $01 if there is a checksum, as described in connection with FIG. 2. If there is a checksum, this is followed by a checksum created by summing the octets of the executable code together, and taking the result modulo 256. This is useful because this lets the executable code be examined before executing, to reduce the possibility that there have been transmission errors that might cause erroneous instructions to be executed.

The final element is the binary or ASC I I data of the executable code to be embedded in the MPEG data stream. As earlier explained, in FIG. 3, it is necessary to perform the "unsynchronization" step within the executable code, where any occurrences of the bit sequence 11111111 111xxxxx, where "x" represents a bit which may either be 0 or 1, must be replaced. This is because MPEG players use such a bit sequence to identify the beginning of the audio data, and would otherwise begin interpreting the executable code as audio data. In the unsynchronization technique defined in the ID3v2 specification, all such sequences are replaced with the sequence: 11111111 00000000 111xxxxx. Additionally, all sequences of the form $FF $00 are replaced with the sequence $FF $00 $00.

The EXEC frame of the invention just described is then embedded in the ID3v2 tag as described in the ID3v2 specification. The resulting ID3v2 tag is then placed at the beginning of the MPEG audio stream, FIG. 3, using the standard techniques described in the ID3v2 specification.

In the preferred embodiment of the invention, the decoding process is a simple reversal of the encoding process above-detailed. The ID3v2 tag is extracted from the beginning of the MPEG audio stream, and the relevant data is retrieved from the EXEC frame. The unsynchronization step in the executable code is then reversed, replacing all occurrences of $FF 00 XX by the sequence $FF XX, where XX represents any binary octets. If there is a checksum encoded in the EXEC frame, the octets of the executable code are summed, the result taken modulo 256, and compared with the encoded checksum. If they are equal, then execution proceeds.

Based on the MIME type of the executable code, an appropriate execution environment is instantiated. In the case of the application/x-shockwave-flash type discussed previously, a reference execution environment is described by Macromedia in the Flash Standards Web page.

The execution environment is then invoked to begin execution of the executable code simultaneously with the playback of the audio file. Additional Application Programming Interfaces (APIs) may be defined with reference to the execution environment to control the exact behavior of the execution environment relative to the audio file while playback is occurring.

Specific references for fuller details of the above-explained techniques usable in the encoding and decoding process components of the invention, are:

[ISO-8859-1] ISO/IEC DIS 8859-1.

8-bit single-byte coded character sets, Part 1: Latin alphabet No. 1. Technical committee/subcommittee JTC 1/SC 2;

[MIME] Freed, N. and N. Borenstein, "Multipurpose Internet Mail Extensions (MIME) Part One: Format of Internet Message Bodies", RFC 2045, November 1996.

and

[UNICODE] ISO/IEC 10646-1:1993.

Universal Multiple-Octet coded Character Set (UCS), Part 1: Architecture and Basic Multilingual Plane. Technical committee/subcommittee: JTC1/SC 2

Figure 4:
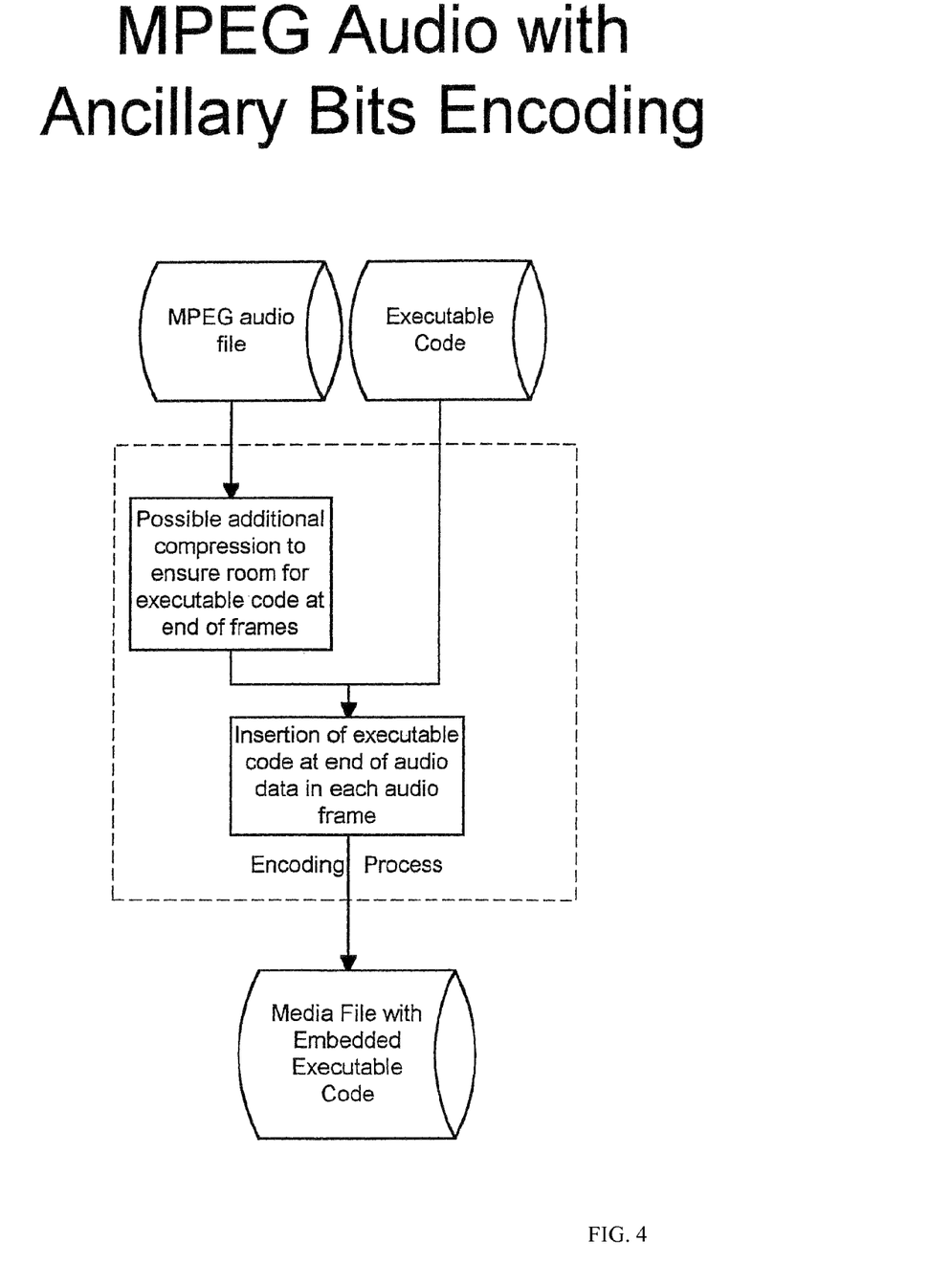
FIGS. 4 and 5 are similar diagrams directed respectively to using ancillary bits encoding and private stream encoding with the MPEG.

A further modification is illustrated in FIG. 4 wherein, for example, the MPEG audio file allows for ancillary bits at the end of an audio packet for padding purposes. In MPEG-2 these bits are used to encode surround sound data. The MPEG audio file is there shown subjected to additional compression to insure room for the insertion of executable code at the end of audio frames. To improve the quality of the audio compression process, it may be best to recompress from the uncompressed audio file, rather than recompressing the MPEG audio at a lower bit-rate. As illustrated in FIG. 4, this is then combined in the encoding process with the executable code, with the insertion thereof at the end of the audio data in each audio frame. As above stated, since MPEG-2 uses the ancillary bits to encode surround sound data, it is necessary to ensure that the embedded code is not misinterpreted as surround sound audio data. The resulting media file with its embedded executable code is again backwards compatible, but the audio quality may be slightly, though entirely acceptably, diminished due to the additional compression.

Figure 5:
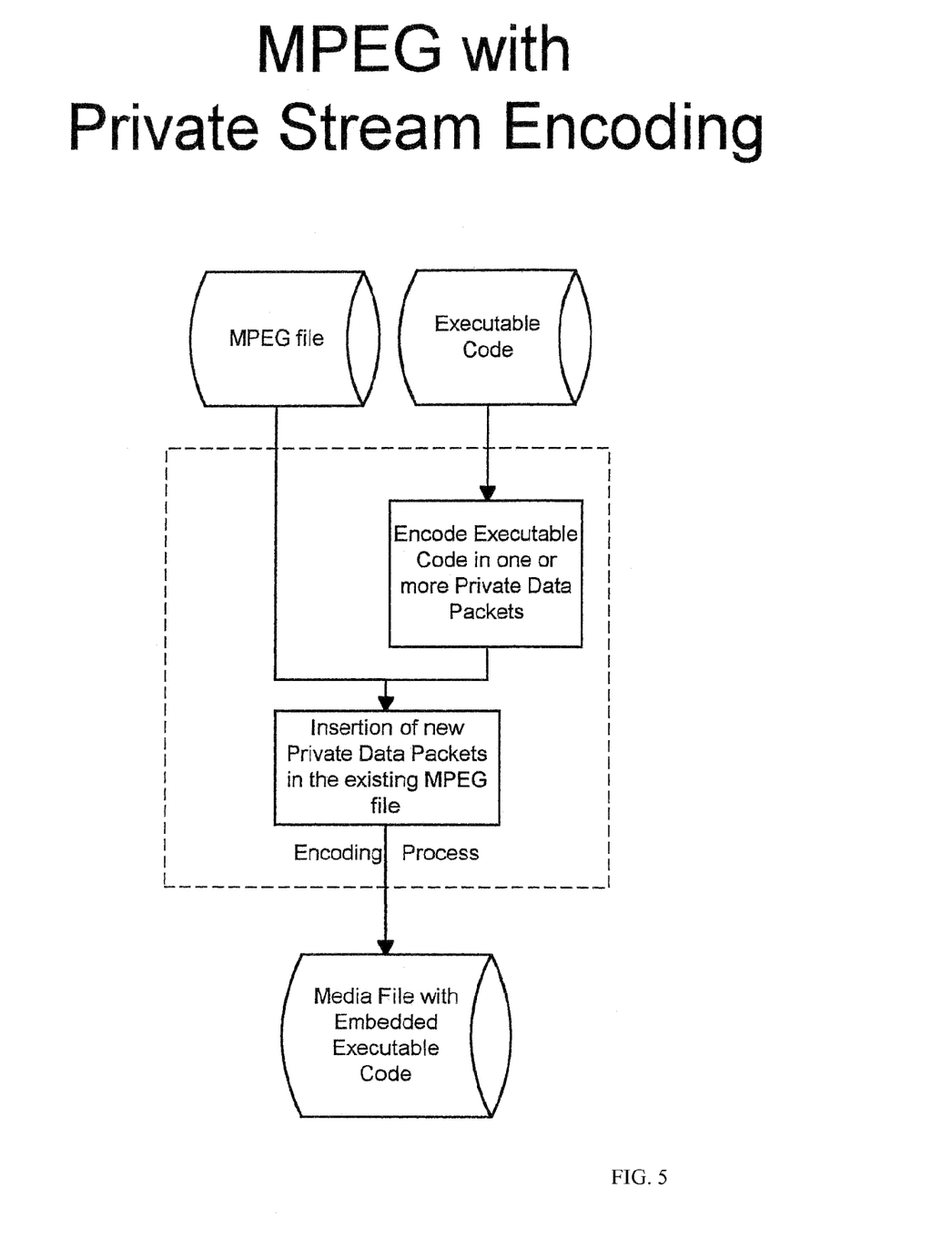

Another MPEG variant modification is illustrated in FIG. 5, providing for additional "private" streams of data to be encoded in addition to the standard audio and video streams of the MPEG file. As shown, the executable code is encoded in one or more private data packets, using either synchronized or unsynchronized private data streams, and inserted in the encoding process into the existing MPEG file. The executable code-embedded media file that results, has a slightly increased file size to accommodate the executable code.

Figure 6:
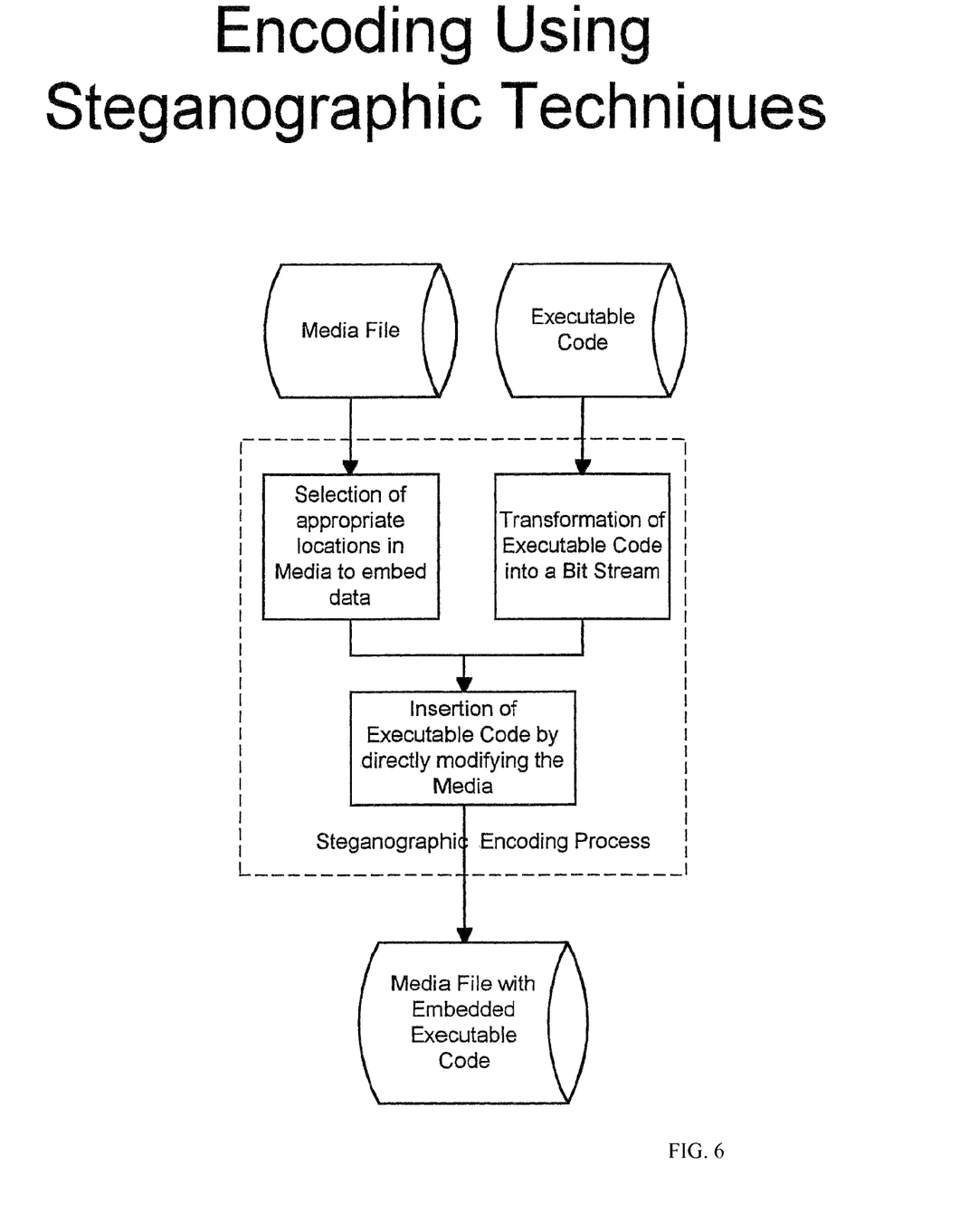
FIG. 6 is a diagram showing the incorporation of the previously (and later) discussed steganographic techniques into the encoding.

As earlier mentioned, steganographic techniques may be usefully employed, particularly in those applications such as digital "watermarking" (see, for example, earlier cited U.S. Pat. No. 5,889,868 and the Langelaar article). FIG. 6 illustrates encoding in accordance with the process of the present invention using such steganographic techniques, which enables embedding much more then the prior art 300 bits/second of executable code.

As shown on the left-hand side of the figure, the media file is subjected to a selection process involving selecting appropriate locations in the media file at which to embed data, based on the identification of minor changes that can be made to the actual media file content with minimal effects to the user's playback experience of the file. These changes, moreover, must be such that they can easily be detected by automated decoding, and the information accordingly recovered. Meanwhile, on the executable code side (right-hand in FIG. 6), the code is transformed into a bit stream, as shown, by extracting the bytes of the executable code into a bit-by-bit representation, so that they can be inserted as such small changes into the media file. The thusly transformed executable code is then, in this steganographic encoding process, inserted at the appropriate locations of the media file by any well-known encoding technique, including those, for example, of earlier cited U.S. Pat. No. 5,687,236. The resulting executable code-embedded media file may, in some cases, slightly, but again totally acceptably, diminish the user's usual playback experience due to the embedding process.

Figure 7:
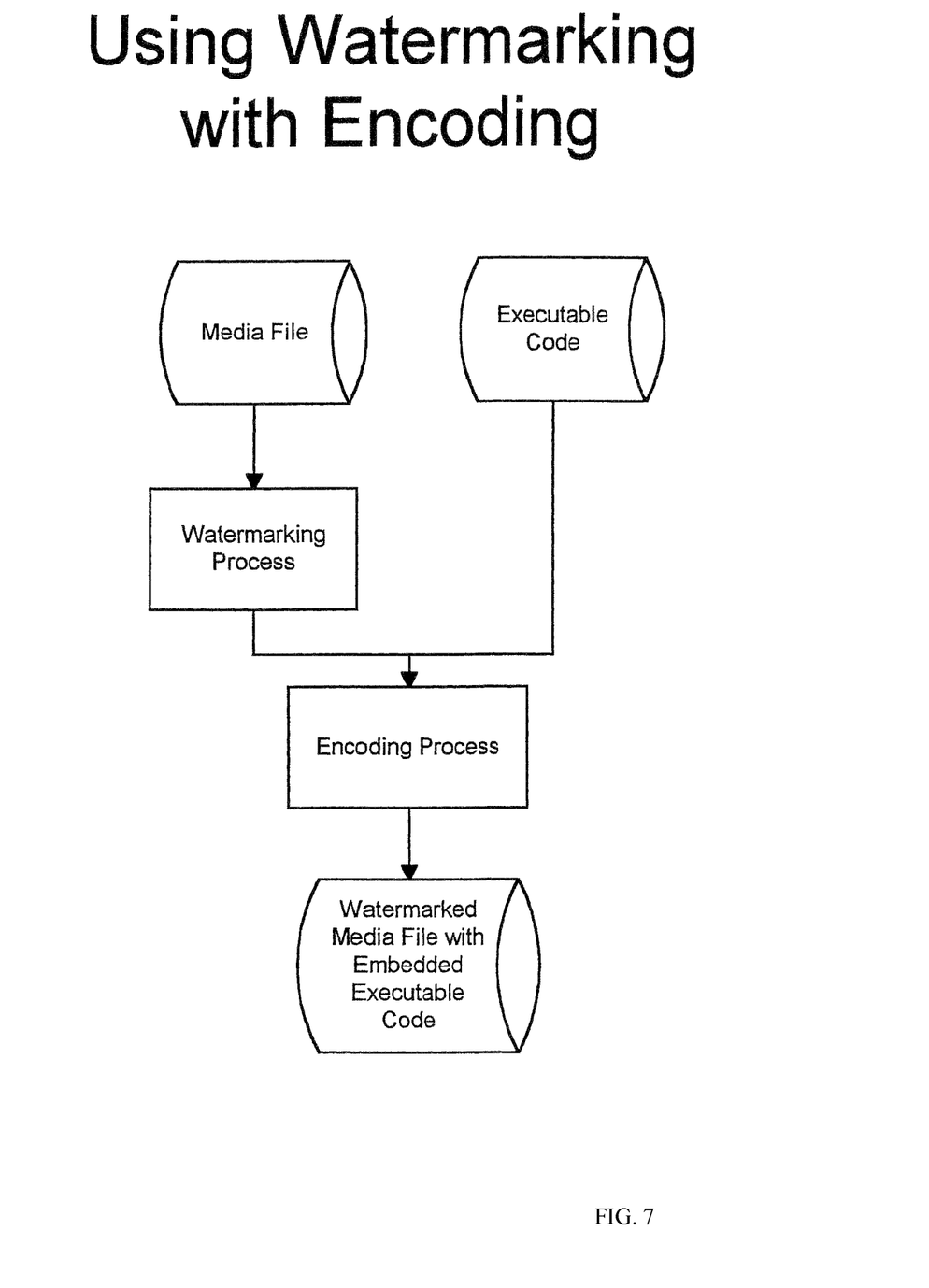
FIG. 7 illustrates the use of the before-mentioned watermarking processes with the encoding technique of the invention.

In FIG. 7, the imbuing of the media file with a robust watermark and embedded executable code is illustrated. Most watermarking processes, including those earlier referenced, are robust and are not easily removed by modification of the media file, so they are not affected by a later encoding process to embed the executable code, as shown in FIG. 7, wherein the data embedding is illustrated as effected after watermarking. This accommodates for data embedding techniques not robust to modifications of the media file.

We have performed successful preliminary tests of several of these various encoding techniques of the invention. Using an exemplary audio file taken from the song "Jealousy" by Natalie Merchant, we encoded as an MP3 at 128 kbits/sec, using Fraunhofer's mp3enc encoder. The encoded portion of the file is 30 seconds long, and is 720 kilobytes in size. The primary encoding technique chosen was the Phase/Magnitude Frequency-Domain Low-Bit Coding Technique, while varying the interval at which data was encoded in the file.

The successful results are as shown in Table I below:
TABLE-US-00001 TABLE I Date Rate Files Embedding Interval Achieved Affected Sound Quality Original none original CD mp3 none none slight compression artifacts mp3 w/1 bit/16 coefficients 2800 bits/sec close to original mp3 data 1 bit/8 coefficients 5600 bits/sec 1 bit/4 coefficients 11200 bits/sec some artifacts The use of low-bit coding in which the least-significant bits of an audio portion of a media file are used, may be applied so as to spread the introduced noise substantially equally throughout the audio spectrum of the media file, thus reducing its perceived effect. Frequency-domain low-bit coding may also be used for encoding, in which the least-significant bits of the coefficients of the compressed audio portion of the media file are used.

Further modifications will also occur to those skilled in this art, and are considered to fall within the spirit and scope of the invention as defined in the appended claims.

We claim:

1. A method comprising:
via a computer device, performing operations of:
receiving a media file including playable content, the playable content encoded for playback by a media player device;
receiving executable code, the executable code independently executable with respect to playback of the playable content;
modifying the media file to include the executable code, the executable code encoded for execution by the media player device; and
wherein modifying the media file to include the executable code includes: inserting a portion of the received executable code as a replacement for a portion of the playable content in the media file.

2. The method as in claim 1 further comprising:
initiating distribution of the modified media file to the media player device, the media player device operable to parse the modified media file into the playable content and the executable code, the executable code encoded for execution by a first process in the media player device, the playable content encoded for playback by a second process in the media player device, the first process independent of the second process.

3. The method as in claim 1, wherein modifying the media file includes:
producing a frame of the media file to include at least a portion of the executable code;
generating tag information indicating that the frame includes the executable code, which is to be executed by a first process in the media player device independent of a second process in the media player device operable to render the playable content on a display screen of the media player device; and
tagging the frame in the media file with the tag information to indicate presence of the executable code in the frame of the media file.

4. The method as in claim 1 further comprising:
modifying the digital file to include tag information indicating presence of the executable code for execution during playback of the playable content.

5. The method as in claim 1, wherein modifying the media file includes:
transforming the executable code into a bit stream; and
utilizing an encoding process to insert portions of the bit stream of executable code at multiple locations in the received media file.

6. The method as in claim 1, wherein modifying the media file includes:
applying low-bit coding to the playable content in which least-significant bits of the playable content in the received media file are used to store the executable code.

7. The method as in claim 6, wherein presence of introduced noise by the applied low-bit coding is spread throughout an audio spectrum of a rendition of the playable content when played back by the media player device.

8. The method as in claim 1, wherein modifying the media file includes:
applying frequency-domain low-bit coding to the playable content in which least-significant bits of corresponding coefficients of a compressed audio portion of the playable content in the received media file are used to store the executable code.

9. The method as in claim 1 further comprising:
generating the modified media file to include synchronization information, the synchronization information indicating to synchronously execute the executable code during playback of the playable content.

10. The method as in claim 1, wherein the playable content includes display information encoded to be displayed on a first region of a display screen of the media player device; and wherein the executable code, independent of a rendering of the playable content on the first region of the display screen, includes display information encoded to be displayed on a second region of the display screen.

11. A method comprising:
via a playback device, performing operations of:
receiving a media file in which executable code is embedded in playable content stored in the media file;
parsing the media file into the playable content and the executable code;
via a first execution process of the playback device, initiating rendering of the playable content; and
via a second execution process of the playback device, initiating execution of the executable code;
in accordance with the media file, synchronizing execution of the executable code with respect to rendering of the playable content on the playback device; and
wherein parsing the media file includes:
extracting tag information from the media file, the tag information specifying a frame in the media file including a portion of the executable code;
utilizing the tag information to identify that the frame includes executable type of information; and
verifying the portion of the executable code in the frame prior to execution of the portion of the executable code via the second process.

12. The method as in claim 11 further comprising:
initiating simultaneous execution of the executable code on the playback device during rendering of the playable content.

13. The method as in claim 11 further comprising:
on a first region of a display screen of the playback device, via the first execution process, initiating display of images associated with the rendering of the playable content; and
on a second region of the display screen of the playback device, via the second execution process, initiating display of images on the display screen in accordance with the executable code.

14. A method comprising:
via a playback device, performing operations of:
receiving a media file in which executable code is embedded in playable content stored in the media file;
parsing the media file into the playable content and the executable code;
via a first execution process of the playback device, initiating rendering of the playable content;
via a second execution process of the playback device, initiating execution of the executable code; and
wherein the executable code is executable to support playback of interactive video which responds to and is synchronized with movement of a user operating the playback device.

15. The method as in claim 14 further comprising:
via the first execution process of the playback device, initiating display of images associated with the rendering of the playable content on a first region of a display screen of the playback device; and
via the second execution process of the playback device, initiating display of images associated with the executable code on a second region of the display screen.

* * * * *